Aug. 23, 1927.

L. D. KAY 1,640,339

DUAL TIRED WHEEL

Filed Sept. 1, 1926

Inventor
Lloyd D. Kay
By Lyon & Lyon
Attorneys

Patented Aug. 23, 1927.

1,640,339

UNITED STATES PATENT OFFICE.

LLOYD D. KAY, OF LOS ANGELES, CALIFORNIA.

DUAL-TIRED WHEEL.

Application filed September 1, 1926. Serial No. 133,059.

This invention relates to dual-tired wheels and particularly to a type of this wheel which is adapted for use as a truck wheel. These wheels carry an inboard tire which is disposed near the body of the truck and an outboard tire. The wheels are usually constructed in such a way that the inboard tire with its rim is slipped over the wheel from the outer side until it comes upon its seat which is located near the inboard side of the wheel. After the inboard rim and tire have been secured in place, then the outboard tire is applied and secured on its seat or seats. As usually constructed, the wheel is formed with an inboard felloe and an outboard felloe, the former of which carries the seat or seats for the inboard tire rim, and a gap or space is formed around the wheel between the felloes. In slipping the inboard tire over the wheel, there is therefore no support for it on the wheel between the felloes. This increases the difficulty of handling the inboard tire in putting it in place and one of the difficulties arises from the fact that it is necessary to hold the lugs on the inner face of the tire rim in alignment with the lugs on the wheel in order to secure the rim to the wheel. It is also customary to construct these wheels so that the outboard side of the wheel is formed of spokes but without any continuous felloe connecting them, the seats for the outboard tire rim being formed at the ends of the spokes; the seats for the lugs of the inboard tire rim are formed at intermediate points on a continuous felloe or rim extending around the inboard side of the wheel.

The general object of this invention is to improve the construction of wheels of this type and to provide a construction for the spokes which will give the same great strength and properly transmit the load from the tire rims to the hub of the wheel; also to provide a construction for the wheel which will facilitate the passing of the inboard tire and rim over the gap in the wheel between its outboard side and its inboard side.

Further objects of the invention will appear hereinafter.

The invention consists of the novel parts and combination of parts to be described hereinafter, all of which contribute to produce an efficient dual-tired wheel.

A preferred embodiment of the invention is described in the following specification, while the broad scope of the invention is pointed out in the appended claims.

Figure 1:
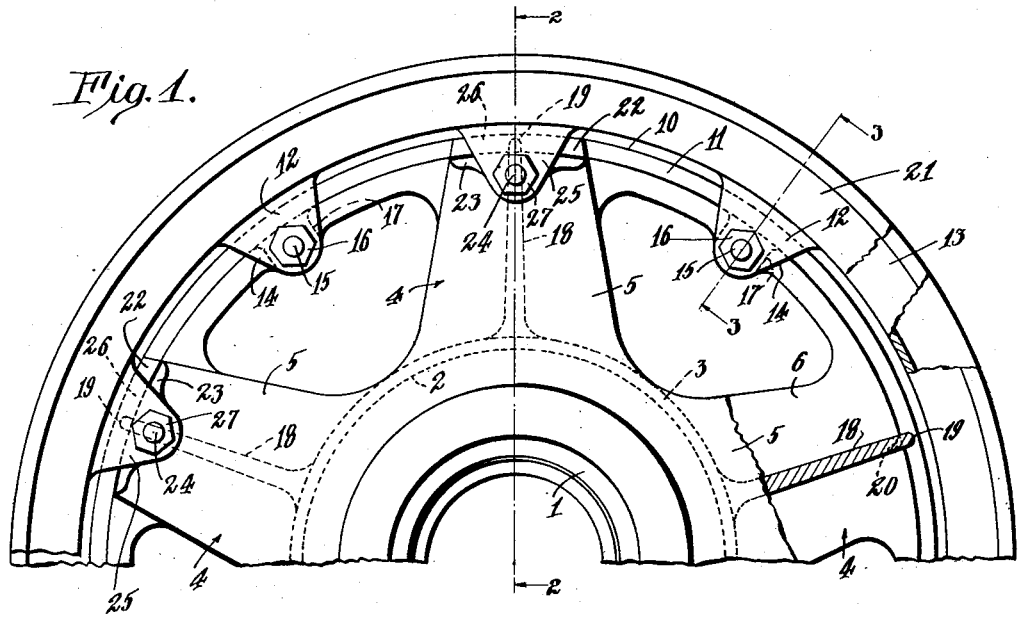
Figure 1 is a side elevation and partial section of a wheel embodying my invention, the lower portion of the wheel being broken away.
Figure 2:
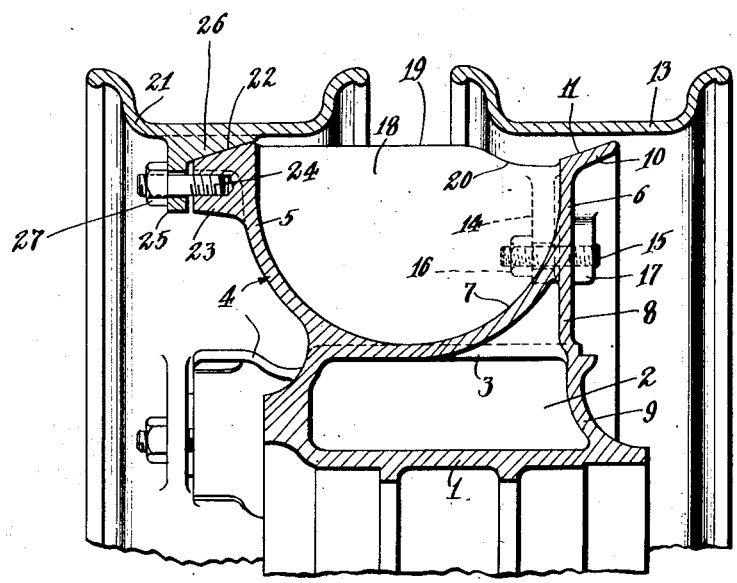
Figure 2 is a vertical section through the wheel taken about on the line 2—2 of Figure 1.
Figure 3:
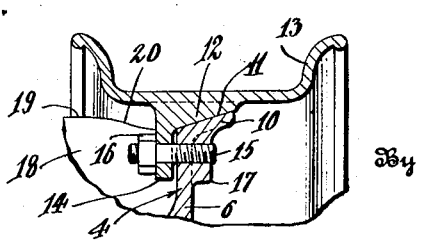
Figure 3 is a cross-section taken on the line 3—3 of Figure 1.

In practicing the invention, I construct the wheel with a hub portion 1 which may be of any suitable construction so that it can be bored to be applied directly to the wheel or to receive an inner hub. This hub portion has a box form chamber 2 which extends continuously around it, the outer wall 3 of which operates as the periphery of the hub portion 1. At a plurality of points around this hub portion, I provide spokes 4. Each of these spokes has an outboard wall 5 and an inboard wall 6, and the material of which the wheel is cast is preferably disposed in an arch 7 which is formed in a plane extending longitudinally with the axis of the wheel, that is to say, the axis on which the wheel rotates. The inboard wall 6 of the spokes is formed with an extension 8 which is substantially tangent with the inboard end of the arch and unites integrally to the inboard end of the wall 9 of the hub portion. At the inboard side, the wheel is preferably formed with a continuous flange or felloe 10 which extends around the wheel, and this flange has an inclined outer face 11 which operates as a seat for the lugs 12 which are formed on the inner face of the inboard tire rim 13. These lugs 12 have inclined faces (see Figure 3) which seat against the face 11 and each lug also has an inwardly extending ear 14 through which the stud 15 passes. A nut 16 is provided on the inner end of the stud to secure the lug 12 on its seat. These studs 15 are mounted in bosses 17 formed respectively on the inboard wall of the spoke.

Each spoke is formed with a web 18 which extends transversely across the arch of the spoke. That is to say, these webs are located on the center line of each spoke so that they are disposed substantially in radial planes with respect to the axis of the wheel. The outer edge 19 of each web is substantially in line with the outer edges of the arch. With this construction for the wheel, it will be evident that in placing the inboard rim 13 with its tire in position, it can be slipped over the wheel and it will be supported on the edges 19 of the webs. The outer edges, or the outboard ends of these edges 19 are preferably formed with a slight dip 20; this facilitates the proper centering of the ears 14 with the studs 15 when the tire rim arrives at its seating position at the felloe 10.

In order to secure the outboard rim 21 in place, I provide an inclined rim seat 22 at the outer end of each spoke and on its outboard side. Adjacent to each seat, the spoke is provided with a boss 23 carrying a stud 24 which passes through an ear 25 projecting inwardly from each lug 26. These lugs correspond to the seats 22 and are formed on the inner face of the tire rim. The tire rim is secured in place by nuts 27 similar to the nuts 16.

With this construction for the wheel, it will be evident that there is no felloe or rim portion on the outboard part of the wheel, so that no obstruction is offered to the lugs 12 when the inboard tire rim is being slid over the wheel. When this takes place, the edges 19 operate as guides for the tire rim and support it and guide it in position.

The use of the arch 7 in the construction of the spoke gives the spoke and wheel great strength and this strength is increased by the presence of the web 18.

I prefer to make the seats 22 as conical faces with the same diameter and taper as the seat face 11 of the flange 10. This simplifies the machining operation and also enables the outboard tire-rims to be duplicates of the inboard rims.

It is understood that the embodiment of the invention described herein is only one of the many embodiments this invention may take, and I do not wish to be limited in the practice of the invention, nor in the claims, to the particular embodiment set forth.

What I claim is:

1. A dual-tired truck wheel having a hub portion with a plurality of spokes projecting outwardly therefrom, each of said spokes having an inboard wall near the inboard side of the wheel and an outboard wall near the outboard side of the wheel, said wheel having a circumferential rim-portion connecting the spokes and integral with the said inboard wall, said rim-portion having an inclined outer face operating as a seat for the inboard tire rim, said spokes having seats for the outboard tire rim and having transverse webs extending between the inboard and outboard walls of the spokes, operating to support and guide the inboard tire rim when being slid over the wheel onto the said rim-portion.

2. A dual-tired truck wheel having a hub portion with a plurality of spokes projecting outwardly therefrom, said spokes being in the form of an arch with the convex side of the arch disposed toward the hub portion, one end of the arch forming the inboard wall of the spoke and the other end forming the outboard wall, the inboard end of said arch having a felloe with a face operating as a seat for the inboard tire-rim, the outboard end of said arch having a seat to receive the outboard tire-rim, said arch having a transverse web connecting the opposite sides of the arch and operating as a guide for the inboard tire-rim when the same is slipped over the wheel from the outer side.

3. A dual-tired truck wheel having a hub portion with a plurality of spokes projecting outwardly therefrom, the ends of said spokes being unconnected at the outboard side of the wheel, said spokes being in the form of an arch with the convex side of the arch disposed toward the hub portion of the wheel, a continuous rim portion on the inboard side of the wheel integrally connecting the spokes at the inboard end of the arch and operating as a seat for the inboard tire rim, said spokes having a seat for the outboard tire rim and having a transverse web extending across the arch with its outer edge about on a line with the said rim-portion, whereby the said webs operate to support and guide the inboard tire rim when being slipped over the wheel and onto its seat.

4. A dual-tired truck wheel having a single inboard seat for the inboard tire-rim, and a single outboard seat for the outboard tire-rim, and having a hub portion with a plurality of spokes projecting outwardly therefrom, said spokes being in the form of an arch with the convex side of the arch disposed toward the hub portion, one end of the arch forming the inboard wall of the spoke and the other end forming the outboard wall, the inboard end of said arch having a felloe with a face operating as the said inboard seat for the inboard tire-rim, the outboard end of said arch having a felloe with a face operating as the said outboard seat to receive the outboard tire-rim.

Signed at Los Angeles, California, this 27 day of August, 1926.

LLOYD D. KAY.